United States Patent
Riou et al.

(10) Patent No.: US 12,337,986 B2
(45) Date of Patent: Jun. 24, 2025

(54) REDUCED BULK ACOUSTIC TREATMENT PANEL FOR A TURBOJET ENGINE

(71) Applicant: SAFRAN AIRCRAFT ENGINES, Paris (FR)

(72) Inventors: Georges Jean Xavier Riou, Moissy-Cramayel (FR); Fernando Gea Aguilera, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 70 days.

(21) Appl. No.: 18/257,810

(22) PCT Filed: Dec. 14, 2021

(86) PCT No.: PCT/FR2021/052328
§ 371 (c)(1),
(2) Date: Jun. 15, 2023

(87) PCT Pub. No.: WO2022/129778
PCT Pub. Date: Jun. 23, 2022

(65) Prior Publication Data
US 2024/0101264 A1    Mar. 28, 2024

(30) Foreign Application Priority Data
Dec. 15, 2020    (FR) ..................... 2013230

(51) Int. Cl.
*F02C 7/045* (2006.01)
*B64D 33/04* (2006.01)

(52) U.S. Cl.
CPC .............. *B64D 33/06* (2013.01); *F02C 7/045* (2013.01)

(58) Field of Classification Search
CPC ..... B64D 33/06; F02C 7/045; F05D 2260/96; F05D 2260/93; F05D 2260/964
See application file for complete search history.

(56) References Cited

U.S. PATENT DOCUMENTS

| 3,821,999 A | 7/1974 | Guess et al. |
| 4,743,740 A * | 5/1988 | Adee ...................... B64D 15/00 219/547 |

(Continued)

FOREIGN PATENT DOCUMENTS

| FR | 3070529 A1 | 3/2019 |
| FR | 3085783 A1 | 3/2020 |

OTHER PUBLICATIONS

French Search Report issued in French Application No. 20 13230, mailed on Aug. 19, 2021.

(Continued)

*Primary Examiner* — Steven M Sutherland
(74) *Attorney, Agent, or Firm* — Bookoff McAndrews, PLLC

(57) ABSTRACT

An acoustic treatment panel including acoustic absorption cells each comprising a bottom wall, a porous inlet wall, an enclosure extending in an axial direction between the bottom wall and the inlet wall, and a first acoustic horn extending inside the enclosure between a first opening and a second opening that is smaller than said first opening, the first opening facing said inlet wall. Each cell comprises a second horn extending inside the enclosure in the first axial direction between a first opening of the second horn and a second opening of the second horn that is smaller than said first opening.

20 Claims, 4 Drawing Sheets

(56) References Cited

U.S. PATENT DOCUMENTS

| | | | |
|---|---|---|---|
| 2003/0156940 A1* | 8/2003 | Czachor | ............... F01D 21/045 415/119 |
| 2008/0308345 A1 | 12/2008 | Borchers et al. | |
| 2013/0186707 A1 | 7/2013 | Richter | |
| 2019/0063318 A1 | 2/2019 | Roach et al. | |

OTHER PUBLICATIONS

International Search Report and Written Opinion issued in International Application No. PCT/FR2021/052328, mailed on Apr. 26, 2022.

* cited by examiner

[Fig.1]
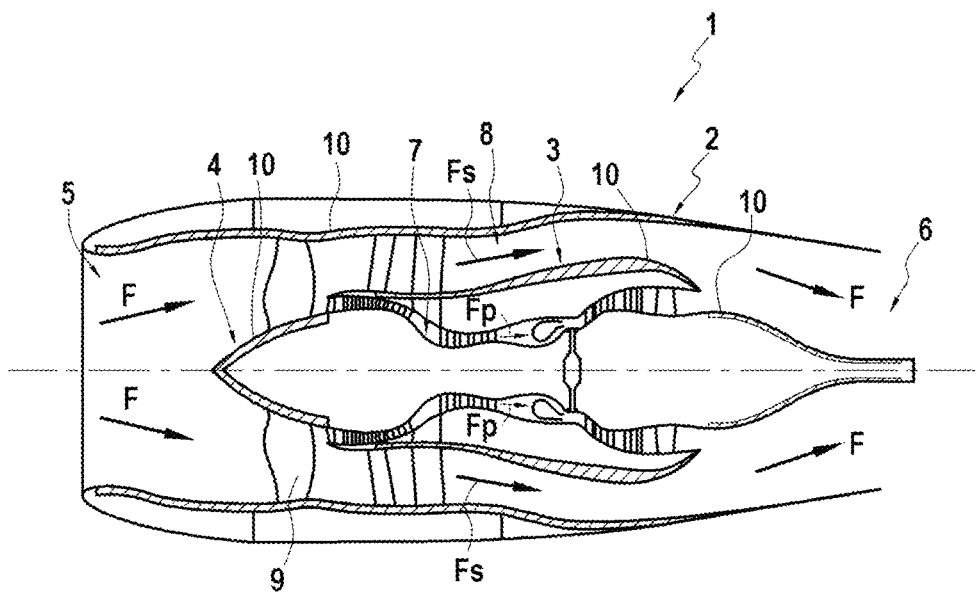
[Fig.2]
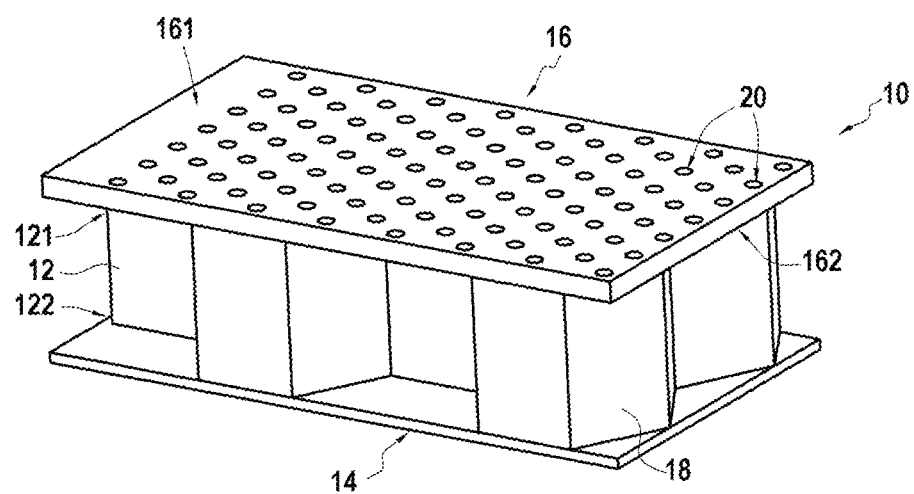

[Fig.3]
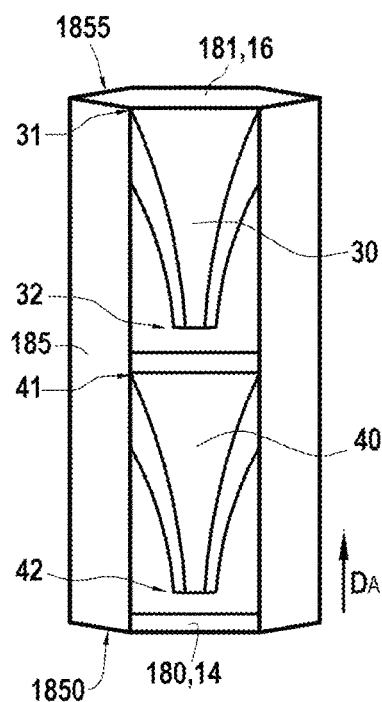
[Fig.4]
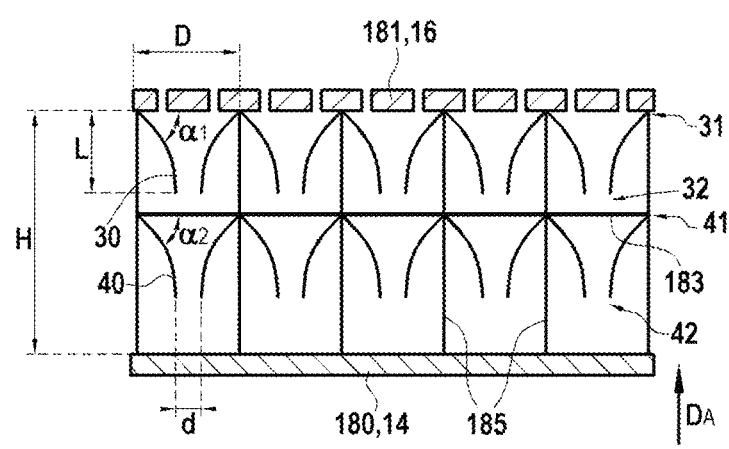

[Fig.5]
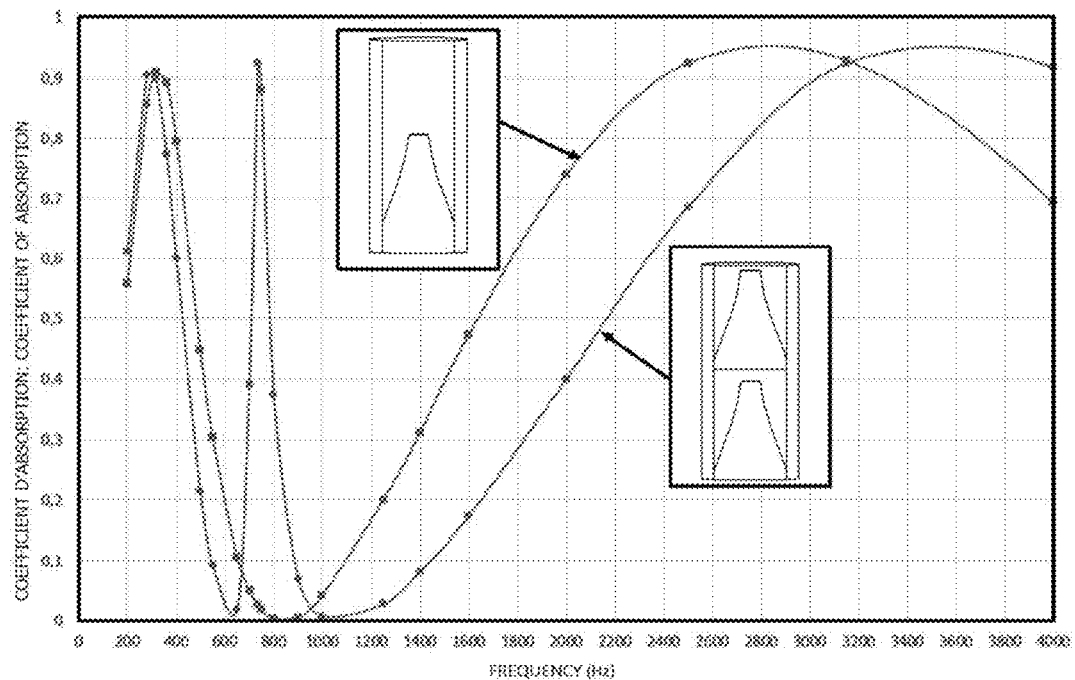
[Fig.6]
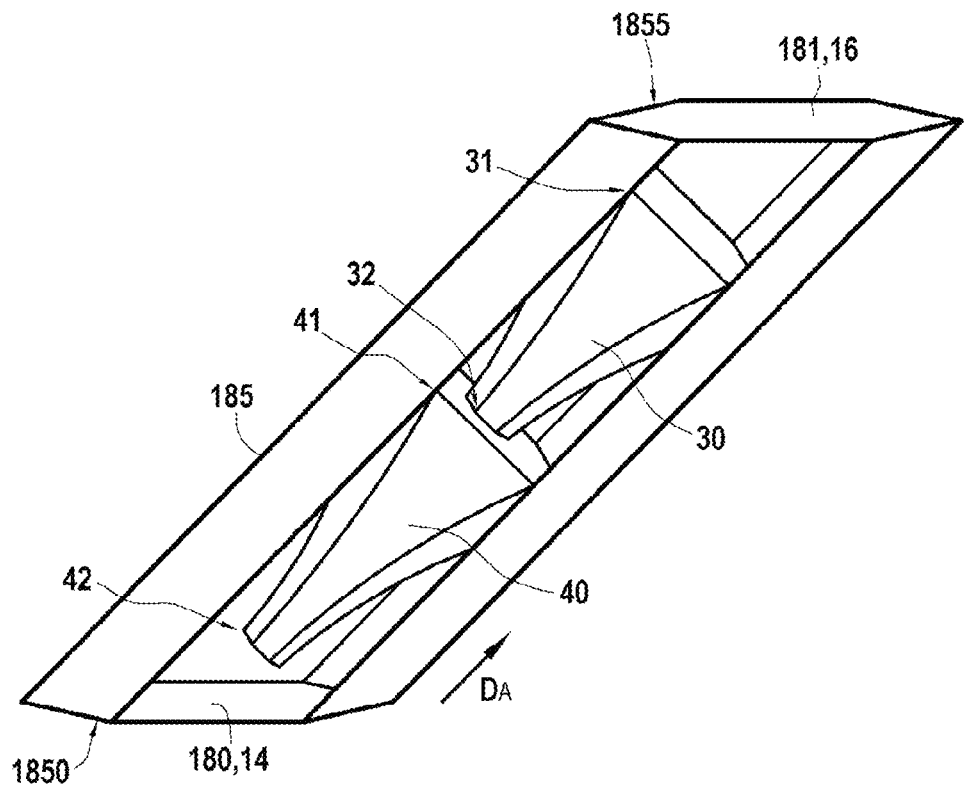

[Fig.7]
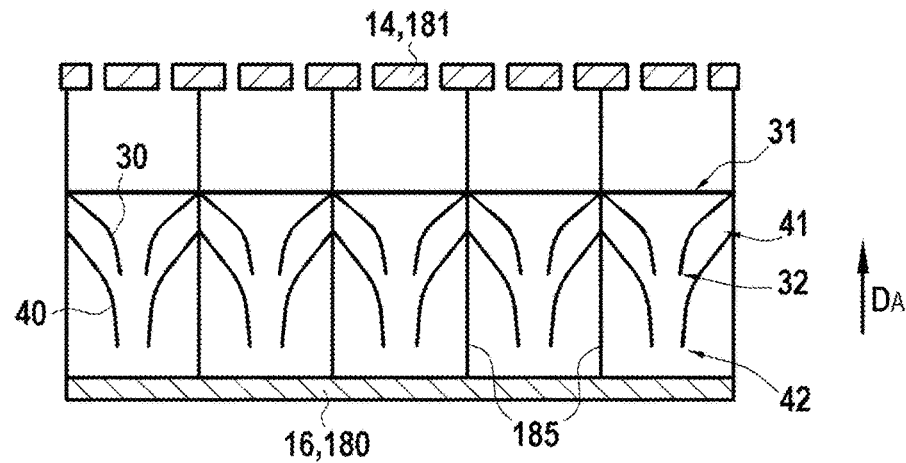
[Fig.8]
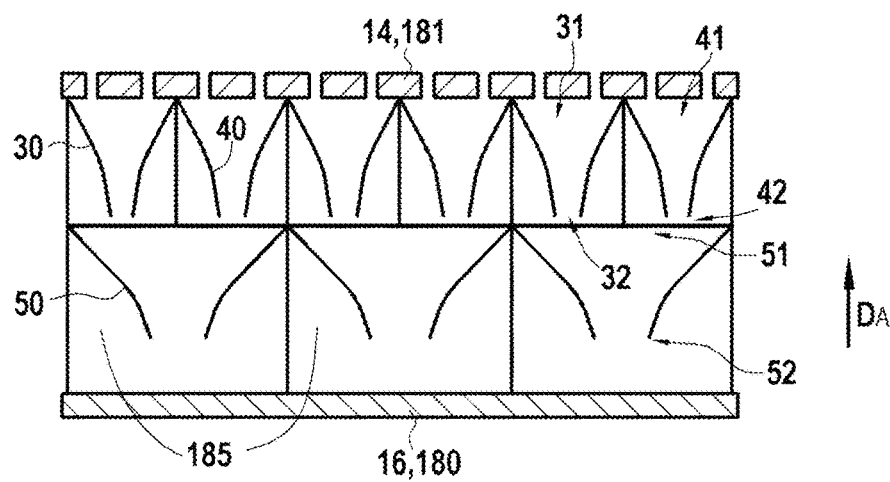
[Fig.9]
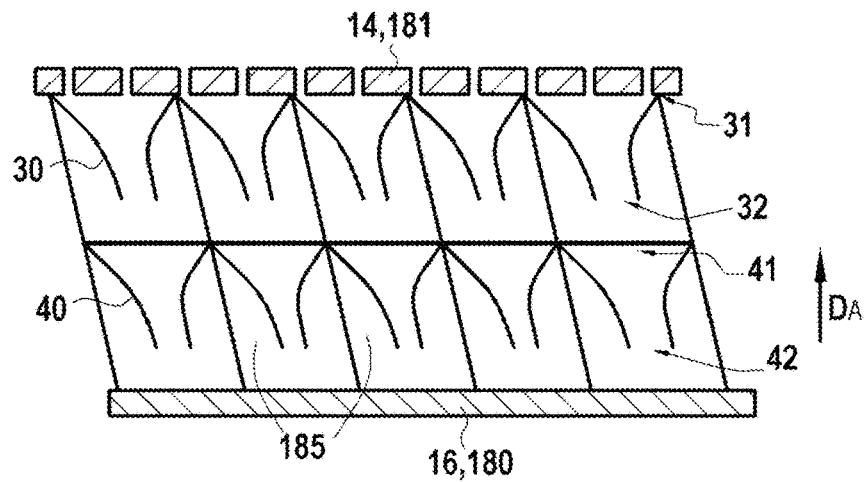

REDUCED BULK ACOUSTIC TREATMENT PANEL FOR A TURBOJET ENGINE

CROSS-REFERENCE TO RELATED APPLICATIONS

This is a National Stage Application under 35 U.S.C. § 371 of International Application No. PCT/FR2021/052328, filed Dec. 14, 2021, now published as WO 2022/129778 A1, which claims priority to French Patent Application No. 20 13230, filed on Dec. 15, 2020.

TECHNICAL FIELD

The invention relates to an acoustic treatment panel for absorbing sound waves, and more particularly an acoustic absorption cell of an acoustic treatment panel for absorbing sound waves at low frequencies integrable into a reduced bulk.

PRIOR ART

Acoustic absorption cells are intended to reduce undesirable noise. This reduction is carried out for various reasons, for example to protect the human ear against damage or to reduce the impact of the noise. In technical equipment and parts, acoustic protection may be necessary to ensure the satisfaction of standards in effect regarding sound emissions, as well as to protect them from damage (acoustic fatigue). One of the challenges of turbojets with high bypass ratios is the certification of sound levels during the operations of takeoff and landing of an airplane. In fact, the sound levels emitted by the airplanes are subject to stricter and stricter international regulations in order to limit the acoustic footprint in the vicinity of airports. Moreover, acoustic fatigue can occur, for example on the landing flaps of airplanes in proximity to the engines, or on the useful load components of space launch systems, due to the powerful noise generated during launch.

Conventionally, the reduction of the noise of a turbojet, and more precisely of that radiated by the interaction between the rotors and their environment, is accomplished by means of absorbent panels arranged on the wetted surfaces of the ducts in which the sound waves propagate. What is meant by wetted surfaces are the surfaces in contact with a fluid flow. These panels are sandwich type composite materials containing a honeycomb, the absorbent properties of which are obtained in part due to the principle of Helmholtz resonators formed by the recesses of the honeycomb forming acoustic absorption cells.

A Helmholtz resonator consists of a resonant cavity and of one or more neck(s) extending inside the cavity, each from an opening formed in a wall and allowing the resonant cavity to communicate with the surrounding medium in which the waves to be attenuated propagate. The neck thus provides communication between the ambient medium and the internal air cavity. Once the device is optimized, the neck provides a visco-thermal dissipation effect which corresponds to the rapid and alternating movement of the sound waves through the necks, causing dissipation by friction.

In conventional treatment technologies, the length of the neck is small compared to the height of the cavity. More precisely, in conventional technologies, the length of the neck is equal to the thickness of a wall of composite sheet material (carbon+resin) which constitutes the wetted surface of the treatment, because the neck is obtained simply by perforating this wall. The operation of the Helmholtz resonator is optimized by dimensioning the air cavity so as to obtain maximum acoustic speed at the neck. This optimization imposes cavity height on the order of one-quarter of the wavelength of the main frequency to be treated. Which represents, for a sound wave at a frequency of 100 Hz in ambient air, thus having a length of 3.4 m, a necessary cavity height of:

$$\frac{\lambda}{4} = \frac{3.4}{4} = 0.85m$$

It also offers very advantageous properties with regard to the great width of the frequency band that is covered.

However, current tendencies of the optimization of propulsion systems are oriented toward the reduction of the number of blades and the reduction of the rotation speed of the rotating assemblies such as the fan in ducted architectures (for example, a turbojet designated by the term "turbofan") and/or propellers in non-ducted architectures (for example, an engine with an non-ducted fan, particularly a dual contra-rotating non-ducted fan or "contra-rotating open rotor"). The result is a decline in the frequencies of acoustic radiation.

Optimization of the treatment panels then requires an increase in their thickness to be able to increase the height of the cavity and thus reduce the tuned frequency of the resonant cavities of the panel. This makes the panels incompatible with the mass and bulk constraints associated with the new architectures of the UHBR (Ultra-High Bypass Ratio) type, i.e. having a very high bypass ratio.

In fact, the placement of conventional treatments without cones and tuned to these frequencies requires cavities with thicknesses of 20 to 25 cm. And, with the sizes of so-called narrow nacelles and an acoustic signature starting at particularly low frequencies, ultra-high bypass ratio turbojets cannot use such acoustic treatment panels and therefore necessitate the use of specific acoustic coatings. More precisely, as a complement to the conventional absorbent structures treating medium and high frequencies, there is a need for an acoustic treatment which can effectively attenuate low frequencies on the order of 150 to 800 Hz with acoustic treatment panels having reduced bulk.

It is always possible to dimension a Helmholtz resonator so that it is effective at lower frequencies, for a reduced radial bulk, for example, by operating both on the height of the neck and on the volume of the resonant cavity.

The trade-off for this type of dimensioning under the constraint of a given reduced bulk, is that the frequency band on which the treatment acts in an optimal manner is drastically reduced when the frequency is reduced. In fact the insertion of a cone into the resonant cavities in a honeycomb allows increasing the height of the neck and thereby bringing the height of the cell to 7 or 8 cm rather than the 20 to 25 cm of height for a cell with no internal cone. However, this is accomplished at the price of near-zero attenuation in the second- and third-order harmonic frequencies of the fan.

This restriction regarding the width of the attenuation frequency band is very penalizing, because the variation of the speed of the fan depending on the phases of flight and the mass of the airplane causes large evolutions in its acoustic emission frequency. As a result, the treatment dimensioned in this manner will be effective only for an extremely narrow speed range, particularly when the inlet of the cone is in proximity to the perforated sheet.

A known solution for attenuating very low frequencies with relatively thin resonators is to insert a large horn with a conical or hyperbolic shape into a cavity adjusted to the dimensions of this horn, the objective being to increase the distance traveled by the sound wave in the resonant cavity.

An aeronautical application of these absorption cells necessitates producing a horn of this type with a very thin horn wall thickness on the order of 0.1 to 0.2 mm. However, high levels of acoustic excitation, on the order of 140 to 150 dB, and potential mechanical vibrations generated by the engine, do not allow a horn having walls of such a thickness to remain sufficiently rigid to retain its geometry and operate optimally.

To allow its operation and increase the rigidity of the horn, one known solution from application FR 1 858 101 consists of adding strips to attach the cone to the lateral walls or to the bottom wall of the cell in order to minimize its movements.

Another known solution proposes introducing a waveguide duct with a conical shape into the cavities of a resonator of the honeycomb type which can be placed at several heights, possibly in the presence of a septum in the form of porous layers.

Also known is a solution proposing a septum in the form of a porous surface or web, having variable acoustic attenuation and in the form of a cone, in acoustic resonators in the form of honeycomb cavities.

Another known solution proposes a manufacturing method for an acoustic treatment with honeycomb cavities and a separation septum in the form of a cone in each cavity, the septum being produced by means of a porous surface or web.

Other known solutions propose inclining the cavities of the resonators in order to lengthen the path traveled by the acoustic waves without increasing the thickness of the treatment.

Also known from document FR 3 070 529 is an acoustic panel with resonators, in which obstacles have been added in the resonant cavities of the acoustic treatments in order to increase the distance traveled by the acoustic waves without increasing the thickness of the acoustic treatment, which allows improving acoustic attenuation at low frequency.

Another known solution consists of using folded cavities to increase the distance traveled by the acoustic waves.

Another known solution consists of using cavities with an extended neck in the form of a cylinder in order to improve acoustic performance at low frequencies.

DISCLOSURE OF THE INVENTION

The invention seeks to supply an acoustic absorption cell for the absorption of sound waves at low frequencies with a reduced cavity height and the treatment frequency range of which can be modulated as needed.

One object of the invention proposes an acoustic absorption cell comprising an acoustically opaque bottom wall, an acoustically porous inlet wall, such as a perforated sheet for example, an enclosure extending in an axial direction between a first axial end integral with the bottom wall and a second axial end integral with the inlet wall, and a first acoustic horn extending inside the enclosure between a first opening of the first horn and a second opening of the first horn that is smaller than said first opening of the first horn, the first opening facing said inlet wall.

According to a general feature of the object, the acoustic absorption cell comprises a second horn extending inside the enclosure between a first opening of the second horn and a second opening of the second horn that is smaller than said first opening of the second horn.

Preferably, the first horn extends inside the enclosure in a direction parallel to or congruent with the axial direction of the enclosure, and the second horn extends inside the enclosure in a direction parallel to or congruent with said axial direction of the enclosure.

Preferably, the first horn and the second horn are arranged one below the other, aligned or not, i.e. one following the other in a general direction parallel or congruent with their axial direction along which they extend, in other words a direction parallel or congruent to the axial direction of the cell.

What is meant by an acoustically porous wall is a wall which receives openings which allow a portion of the acoustic waves to pass without significantly altering them, whether in terms of intensity or of frequency. What is meant by an acoustically opaque wall is a wall allowing no acoustic wave to pass without altering it at least partially, particularly in intensity. An acoustically opaque wall will reflect the majority of the incident acoustic waves.

The addition of a second horn inside the enclosure of the acoustic absorption cell allows duplicating the attenuation capacities at low frequency, and thus having a second peak of low-frequency attenuation centered on a different frequency. This therefore allows increasing the treatment frequency range of the acoustic absorption cell.

According to a first aspect of the acoustic absorption cell, the first opening of the second horn can be arranged facing the second opening of the first horn and the second opening of the second horn can be arranged facing said bottom wall.

In one variant, the two horns can be coaxial and one can be inserted at least partially in the other.

In another variant, the first horn and the second horn can be placed side by side, the two horns extending along two parallel axes. In another variant, the acoustic absorption cell can comprise a plurality of horns placed side by side, the horns extending along axes parallel to one another.

In another variant, the acoustic absorption cell can comprise a third horn extending in a direction parallel or congruent with the first axial direction between a first opening and a second opening, the first and the second horns being set one beside the other and both leading via their second opening into the third horn.

According to a second aspect of the acoustic absorption cell, the enclosure can extend between the bottom wall and the inlet wall while forming a nonzero inclination angle β not orthogonal to the inlet wall, on the one hand, and to the bottom wall, on the other hand.

The use of cells inclined with respect to the contact surface with the exterior fluid flow allows increasing the acoustic length of the cavity defined by the enclosure without modifying the height of the cell separating the bottom wall and the inlet wall measured in a direction orthogonal to the bottom and inlet walls. This increase in the acoustic length of the cavity allows lowering the tuning frequencies of the acoustic absorption cell, i.e. centering the acoustic absorption frequency(ies) of the cell on a lower frequency than in a non-inclined configuration.

According to a third aspect of the acoustic absorption cell, the inclination angle β is preferably comprised between 0° and 60°, 0° being excluded.

According to a fourth aspect of the acoustic absorption cell, the enclosure can define a cylinder the generators of which extend in a first axial direction and the base of which has a circular or polygonal shape.

According to a fifth aspect of the acoustic absorption cell, at least one of the first horn and second horn can comprise surfaces having a nonzero roughness, in order to increase the effects of viscous dissipation in the horn. The roughness can take the form of grooves or bumps on the internal and/or external surfaces of the walls of the horns.

According to a sixth aspect of the acoustic absorption cell, the cross section of the second opening of the first horn can be equal to the cross section of the second opening of the second horn, and the ratio between the cross section of the enclosure at its second end and the cross section of the second opening of the first horn can be comprised between 2 and 100.

According to a seventh aspect of the acoustic absorption cell, the distance between the first opening and the second opening of the first horn in the axial direction can be equal to the distance between the first opening and the second opening of the second horn in the axial direction, and the ratio between the distance between the first opening and the second opening of the first horn in the axial direction and the height of the enclosure measured in the axial direction between its first end and its second end can be comprised between 0.2 and 0.6.

According to an eighth aspect of the acoustic absorption cell, at its first opening the first horn can form an opening angle $\alpha_1$ with a plane parallel to the inlet wall of the cell, and at its first opening the second horn can form an opening angle $\alpha_2$ with a plane parallel to the inlet wall of the cell.

According to a ninth aspect of the acoustic absorption cell, the second opening angle $\alpha_2$ can be identical to the first opening angle $\alpha_1$. In this configuration, the two opening angles are preferably comprised between 60° and 90°.

According to a tenth aspect of the acoustic absorption cell, the first horn and the second horn can have identical shapes and dimensions, the first horn and the second horn each comprising a cylindrical portion with a cross section equal to the cross section of their second opening, the ratio between the length of the cylindrical portion in the axial direction and the length of the horn in the axial direction being less than or equal to 0.8.

The design of the acoustic absorption cells with a first horn and a second horn with identical shapes and dimensions allows reducing the costs of manufacture.

In one variant, the shapes and the dimensions of the first and of the second horns can be different.

According to an eleventh aspect of the acoustic absorption cell, the cell can also comprise a porous internal wall, or septum, extending inside the enclosure and at the first opening of the second horn. In other words, the porous internal wall is arranged inside the enclosure and the second horn is in contact with the porous internal wall at the end bearing its first opening.

According to a twelfth aspect of the acoustic absorption cell, the internal wall, or septum, can be parallel to said inlet wall.

According to a thirteenth aspect of the acoustic absorption cell, the first horn can comprise a portion having a continuous non-straight slope extending from its first opening, and the second horn can comprise a portion having a continuous non-straight slope extending from its first opening.

In another object of the invention, an acoustic treatment panel is proposed intended to be arranged over at least one wall of an aircraft in contact with a fluid flow, the panel comprising a plurality of acoustic absorption cells as defined above.

In another object of the invention, a turbojet intended to be mounted on an aircraft is proposed, the turbojet comprising at least one acoustic treatment panel as defined above. The turbojet can be a ducted turbojet or a non-ducted turbojet. In the case of a non-ducted turbojet, the acoustic panel can be installed at the structure which surrounds the gas generator, and which is therefore in contact with the exterior flow and/or with the flow generated by the fan.

In another object of the invention, an aircraft is proposed comprising at least one turbojet as defined above.

BRIEF DESCRIPTION OF THE DRAWINGS

The invention will be better understood upon reading what follows, by way of indication but without limitation, with reference to the appended drawings in which:

FIG. 1 shows a section view of a turbojet according to one embodiment of the invention, in a longitudinal plane of the turbojet.

FIG. 2 illustrates a partial perspective view of an acoustic treatment panel according to one embodiment of the invention.

FIG. 3 shows schematically a perspective view of an acoustic absorption cell according to one embodiment of the invention.

FIG. 4 shows schematically a section view of a plurality of acoustic absorption cells according to a first embodiment of the invention.

FIG. 5 shows graphically the evolution of the coefficient of absorption as a function of the frequency of the sound wave in Hertz in two different configurations of the acoustic absorption cell.

FIG. 6 illustrates schematically a perspective view of an acoustic absorption cell according to a second embodiment of the invention.

FIG. 7 illustrates a section view of a plurality of acoustic absorption cells according to a third embodiment of the invention.

FIG. 8 illustrates a section view of a plurality of acoustic absorption cells according to a fourth embodiment of the invention.

FIG. 9 illustrates a section view of a plurality of acoustic absorption cells according to a fifth embodiment of the invention.

DESCRIPTION OF THE EMBODIMENTS

Shown in FIG. 1 is a section view of a turbojet 1 according to a non-limiting embodiment of the invention, in a longitudinal plane of the turbojet 1.

The turbojet 1 comprises a nacelle 2, an intermediate casing 3 and an internal casing 4. The nacelle 2 and the two casings 3 and 4 are coaxial. The nacelle 2 defines, at a first end, an inlet channel 5 of a fluid flow and, at a second end opposite to the first end, an exhaust channel 6 of a fluid flow. The nacelle 2 and the intermediate casing 3 delimit between them a fluid flow primary stream 7. The intermediate casing 3 and the internal casing 4 delimit between them a fluid flow secondary stream 8. The primary stream 7 and the secondary stream 8 are arranged in an axial direction of the turbojet, between the inlet channel 5 and the exhaust channel 6.

The turbojet 1 also comprises a fan 9 configured to deliver a flow of air F as fluid flow, the air flow F being divided at the outlet of the fan into a primary flow $F_P$ circulating in the primary stream 7, and a secondary flow $F_S$ circulating in the secondary stream 8.

The turbojet 1 also comprises at least one acoustic treatment panel 10 configured to attenuate acoustic waves emitted by the turbojet 1 before these waves escape radially to the outside from the nacelle 2 of the turbojet 1. In the case of a non-ducted turbomachine, the acoustic treatment would be configured to attenuate or limit refractions of the acoustic waves radiated by the propellers.

Each acoustic treatment panel 10 is configured to attenuate acoustic waves, the frequency of which belongs to a predetermined range of frequencies. In the embodiment illustrated in FIG. 1, the acoustic treatment panels 10 are integrated into the nacelle 2, into the intermediate casing 3 and into the internal casing 4. In the internal casing 4, the acoustic treatment panels 10 are integrated, on the one hand, into the portion upstream of the intermediate casing 3 in the axial direction and in particular into the portion bearing the fan 9 and, on the other hand, into the portion downstream of the intermediate casing 3.

Shown in FIG. 2 is a partial perspective view of an acoustic treatment panel 10 according to one embodiment of the invention.

With reference to FIG. 2, the acoustic treatment panel 10 includes a core 12, a reflecting layer or wall 14 and an inlet layer or wall 16.

The core 12 has a honeycomb structure. More precisely, the core 12 includes a plurality of acoustic cells 18, or recesses, arranged in a known honeycomb structure.

Each recess 18 leads to a first face 121 of the core 12 and to a second face 122 of the core 18 located opposite to the first face 121.

The first face 121 of the core 12 is intended to be oriented toward the primary 7 or secondary 8 air flow stream depending on the placement of the acoustic treatment panel 10. The second face 122 of the core 12 is intended to be oriented opposite to the air stream.

Depending on the embodiment, the core 12 can be made of metal or of a composite material such as a composite material formed from carbon fibers embedded in a hardened resin matrix.

The reflecting layer 14 is suitable for reflecting acoustic waves having a frequency belonging to the predetermined range of frequencies.

The reflecting layer 14 extends facing the second face 122 of the core 12, while being in contact with the second face 122. More precisely, the reflecting layer 14 is integral with the second face 122 of the core 12, glued for example to the second face 122 of the core 12.

Depending on the embodiment, the reflecting layer 14 can be made of metal or of a composite material such as a composite material formed from carbon fibers embedded in a hardened resin matrix. In one variant, the layer forming the bottom of the recesses 18 can be non-reflecting.

The inlet layer 16 extends facing the first face 121 of the core 12, while being in contact with the first face 121. More precisely, the inlet layer 16 is integral with the first face 121 of the core 12, glued for example to the first face 121 of the core 12.

The inlet layer 16 is a single-piece perforated plate comprising a plurality of openings 20 passing through the inlet layer 16 from the first face 161 to the second face 162 of the inlet layer 16. Each opening 20 leads to a recess 18 of the core 12, several openings 20 being able to lead into the same recess 18.

Illustrated schematically in FIG. 3 is a perspective view of an acoustic absorption cell 18 according to a first embodiment of the invention.

The recess 18 comprises an acoustically opaque bottom wall 180, an acoustically porous inlet wall 181, and a cylindrical enclosure 185 with a hexagonal base extending between the bottom wall 180 and the inlet wall 181.

The bottom wall 180 is formed by a reflecting layer 14 of the acoustic treatment panel 10, while the inlet wall 181 is formed by the inlet layer 16 of the acoustic treatment panel 10.

The cylinder formed by the enclosure 185 defines an axial direction $D_A$ corresponding to the direction of the generators of the cylinder. In addition, depending on the embodiment, the base of the cylinder formed by the enclosure 185 can have a shape other than hexagonal. The base can be triangular or quadrilateral or circular or polygonal for example.

In the axial direction $D_A$, the enclosure 185 comprises a first axial end 1850 integral with the bottom 180, and a second axial end 1855 integral with the inlet wall 181.

Each recess 18 of the acoustic treatment panel 10 also comprises two acoustic horns 30 and 40 inside the enclosure 185. The first horn 30 extends in the axial direction $D_A$, between a first opening 31 and a second opening 32, the second opening 32 being smaller than the first opening 31. Likewise, the second acoustic horn 40 extends in the axial direction $D_A$ between a first opening 41 and a second opening 42, the second opening 42 being smaller than the first opening 41.

In the embodiment illustrated in FIG. 3, the first horn 30 and the second horn 40 are aligned in the axial direction $D_A$. More particularly, the first opening 31 of the first horn 30 faces the inlet wall 181, the second opening 32 of the first horn 30 and the first opening 41 of the second horn 40 face one another, even in the same plane, and the second opening 42 of the second horn 40 faces the bottom wall 180.

Shown schematically in FIG. 4 is a section view of a plurality of acoustic absorption cells 18 according to the first embodiment of the invention.

As illustrated in FIG. 4, each recess comprises a cross section having a first equivalent diameter D and height H, the height H being measured in the axial direction $D_A$, and the first equivalent diameter D being measured in the plane in which the inlet wall 181 extends, and corresponding to the diameter of the circumscribed circle at the base of the cylinder formed by the enclosure 185.

The first opening 31 of the first horn 30 and the first opening 41 of the second horn 40 each have an equivalent diameter equal to the first equivalent diameter D of the recess 18. The second opening 32 of the first horn 30 and the second opening 42 of the second horn 40 have the same equivalent diameter, which is equal to a second equivalent diameter d.

The first horn 30 has a length equal to the length of the second horn 40. The length L of each of the two horns 30 and 40 is measured in the same direction as the height H of the recess 18, in this case the axial direction $D_A$.

The first opening 31 of the first horn 30 extends in a plane parallel to the first opening 41 of the second horn 40. From its first opening 31, the first horn 30 extends in a direction forming a first opening angle $\alpha_1$. Likewise, from its first opening 41, the second horn 40 extends in a direction forming a second opening angle $\alpha_2$. The first opening angle $\alpha_1$ and the second opening angle $\alpha_2$ are equal and are comprised between 60° and 90°

The ratio between the first equivalent diameter D and the second equivalent diameter d varies between 2 and 100. The ratio between the length of a horn 30 or 40 and the height H of the recess 18 varies between 0.2 and 0.6.

For example, an acoustic treatment panel 10 comprising recesses 18 according to the first embodiment illustrated in FIGS. 3 and 4 with a height H of 80 mm, a first equivalent diameter D of 19 mm, a horn length L of 35 mm, and a second equivalent diameter d of 6 mm, can allow obtaining two attenuation peaks centered approximately around 300 Hz and 750 Hz as illustrated in FIG. 5.

FIG. 5 is a graphic representation of the absorption coefficient as a function of the frequency of the sound wave in Hertz in a first case of an acoustic treatment cell with a single horn inside the enclosure, and in a second case of an acoustic absorption cell comprising two horns inside the enclosure according to the first embodiment of the invention.

In addition, as appears in FIG. 4, the first horn 30 comprises a portion having a continuous, non-straight slope extending from its first opening 31, and the second horn 40 comprises a portion having a continuous non-straight slope extending from its first opening 41.

In addition, as shown in FIG. 4, the acoustic treatment panel 10 can comprise, for each cell, an internal septum formed by a porous internal wall 183 extending inside the enclosure 185 and at the first opening 41 of the second horn 40.

Illustrated schematically in FIG. 6 is a perspective view of an acoustic absorption cell 18 according to a second embodiment of the invention.

The second embodiment illustrated in FIG. 6 differs from the first embodiment illustrated in FIGS. 3 and 4 in that the axial direction $D_A$ in which the generators of the cylinder formed by the enclosure 185 extend is not orthogonal to the planes in which the bottom wall 180 and the inlet wall 181 respectively extend.

The axial direction $D_A$ in which the wall 185 extends forms an inclination angle β with the inlet 181 and bottom 180 walls, the inlet wall 181 and the bottom wall 180 extending parallel to one another.

The inclination angle β varies between 0° and 60°. This angle allows increasing the volume of the cavity inside the enclosure without increasing the distance separating the inlet wall 181 and the bottom wall 180, this distance being measured in a direction orthogonal to the planes in which the bottom and inlet walls extend.

In addition, the second embodiment differs from the first embodiment in that the first openings 31 and 41 and the second openings 32 and 42 of the first and second horns 30 and 40 extend in planes that are not parallel to the planes in which the inlet wall 181 and the bottom wall 180 extend.

In one variant, the first horn 30 and the second horn 40 can comprise surfaces provided with nonzero roughness to increase viscoelastic friction and thus increase acoustic absorption.

Shown schematically in FIG. 7 is a section view of a plurality of acoustic absorption cells 18 according to the third embodiment of the invention.

The third embodiment illustrated in FIG. 7 differs from the first embodiment illustrated in FIG. 4 in that its acoustic cells 18 do not comprise an internal porous wall (or septum) 183 between the two horns, and in that, for each cell 18, the first horn 30 is inserted partially into the second horn 40. The second opening 32 of the first horn 30 is thus arranged, in the axial direction $D_A$, between the first opening 41 of the second horn 40 and the second opening 42 of the second horn 40.

This third embodiment illustrated in FIG. 7 allows having an acoustic treatment panel that is more compact than the panel according to the first embodiment illustrated in FIG. 4.

Shown schematically in FIG. 8 is a section view of a plurality of acoustic absorption cells 18 according to the fourth embodiment of the invention.

The fourth embodiment illustrated in FIG. 8 differs from the first embodiment illustrated in FIG. 4 in that each acoustic cell 18 comprises at least one third horn 50 extending in the axial direction $D_A$ between a first opening 51 and a second opening 52, and in that the first horn 30 and the second horn 40 of each cell 18 are set side by side in two directions parallel to the axial direction $D_A$ and leading via their respective second openings 32 and 42 to the first opening 51 of the third horn 50, the second opening 52 of the third horn 50 being arranged facing the bottom wall 180.

In one variant, more than two horns set side by side or in the same direction, can lead into the same horn arranged between the bottom wall 180 and said three or more horns.

Shown schematically in FIG. 9 is a section view of a plurality of acoustic absorption cells 18 according to the fifth embodiment of the invention.

The acoustic cells 18 of the fifth embodiment illustrated in FIG. 9 differ from the acoustic cells illustrated in FIG. 6 in that the first and second openings 31 and 32, and 41 and 42, of each horn 30 and 40 extend parallel to the entry wall 181 and the bottom wall 180.

The invention thus allows supplying an acoustic absorption cell for the absorption of sound waves at low frequencies with a reduced cavity height and the frequency range of which can be modulated as needed.

The invention claimed is:

1. An acoustic absorption cell comprising an acoustically opaque bottom wall, an acoustically porous inlet wall, an enclosure extending in an axial direction between a first axial end integral with the acoustically opaque bottom wall and a second axial end integral with the acoustically porous inlet wall, and a first acoustic horn extending inside the enclosure between a first opening of the first acoustic horn and a second opening of the first acoustic horn that is smaller than said first opening of the first acoustic horn, the first opening facing said acoustically porous inlet wall, wherein the acoustic absorption cell comprises at least one second acoustic horn extending inside the enclosure between a first opening of the second acoustic horn and a second opening of the second acoustic horn that is smaller than said first opening of the second acoustic horn, the second opening of the second acoustic horn being arranged facing said acoustically opaque bottom wall, and either the first opening of the second acoustic horn is arranged facing the second opening of the first acoustic horn, or the first acoustic horn and the second acoustic horn are coaxial and the first acoustic horn is inserted at least partially in the second acoustic horn such that an acoustic wave passes directly from the first acoustic horn to the second acoustic horn.

2. The acoustic absorption cell according to claim 1, wherein the enclosure extends between the acoustically opaque bottom wall and the acoustically porous inlet wall while forming a nonzero inclination angle not orthogonal with the acoustically porous inlet wall and with the acoustically opaque bottom wall.

3. The acoustic absorption cell according to claim 1, wherein a cross section of the second opening of the first acoustic horn is equal to a cross section of the second opening of the second acoustic horn, and a ratio between a cross section of the enclosure at the second axial end and the cross section of the second opening of the first acoustic horn is comprised between 2 and 100.

4. The acoustic absorption cell according to claim 1, wherein a distance between the first opening and the second opening of the first acoustic horn in the axial direction is equal to the distance between the first opening and the second opening of the second acoustic horn in the axial direction, and a ratio between the distance between the first opening and the second opening of the first acoustic horn in the axial direction and a height of the enclosure measured in the axial direction between its first end and its second end is comprised between 0.2 and 0.6.

5. The acoustic absorption cell according to claim 1, wherein at the first axial end the first acoustic horn forms a first opening angle with a plane parallel with the acoustically porous inlet wall of the acoustic absorption cell and, at its first opening the second acoustic horn forms a second opening angle with a plane parallel with the acoustically porous inlet wall of the acoustic absorption cell.

6. The acoustic absorption cell according to claim 5, wherein the second opening angle is identical to the first opening angle.

7. The acoustic absorption cell according to claim 1, wherein the first acoustic horn and the second acoustic horn have identical shapes and dimensions, the first acoustic horn and the second acoustic horn each comprising a cylindrical portion with a cross section equal to a cross section of each second opening, a ratio between a length of the cylindrical portion in the axial direction and a length of the acoustic horn in the axial direction being less than or equal to 0.8.

8. The acoustic absorption cell according to claim 1, comprising at least one porous internal wall extending inside the enclosure and over the first opening of one of the first and second acoustic horn.

9. The acoustic absorption cell according to claim 8, wherein the internal wall is parallel to said acoustically porous inlet wall.

10. The acoustic absorption cell according to claim 1, wherein the first acoustic horn comprises a portion having a continuous non-straight slope extending from its first opening, and the second acoustic horn comprises a portion having a continuous non-straight slope extending from its first opening.

11. An acoustic treatment panel intended to be arranged over at least one wall of an aircraft in contact with a fluid flow, the acoustic treatment panel comprising a plurality of acoustic absorption cells according to claim 1.

12. A turbomachine intended to be mounted on an aircraft, the turbomachine comprising at least one acoustic treatment panel according to claim 11.

13. An aircraft comprising at least one turbomachine according to claim 12.

14. The acoustic absorption cell according to claim 1, wherein the first acoustic horn comprises a portion having a continuous non-straight slope extending from its first opening, and the second acoustic horn comprises a portion having a continuous non-straight slope extending from its first opening.

15. An acoustic absorption cell comprising an acoustically opaque bottom wall, an acoustically porous inlet wall, an enclosure extending in an axial direction between a first axial end integral with the acoustically opaque bottom wall and a second axial end integral with the acoustically porous inlet wall, and a first acoustic horn extending inside the enclosure between a first opening of the first acoustic horn and a second opening of the first acoustic horn that is smaller than said first opening of the first acoustic horn, the first opening facing said acoustically porous inlet wall,
wherein the acoustic absorption cell comprises at least one second acoustic horn extending inside the enclosure between a first opening of the second acoustic horn and a second opening of the second acoustic horn that is smaller than said first opening of the second acoustic horn, the second opening of the second acoustic horn being arranged facing said acoustically opaque bottom wall, and either the first opening of the second acoustic horn is arranged facing the second opening of the first acoustic horn, or the first acoustic horn and the second acoustic horn are coaxial and the first acoustic horn is inserted at least partially in the second acoustic horn,
wherein the enclosure extends between the acoustically opaque bottom wall and the acoustically porous inlet wall while forming a nonzero inclination angle not orthogonal with the acoustically porous inlet wall and with the acoustically opaque bottom wall.

16. The acoustic absorption cell according to claim 15, wherein a cross section of the second opening of the first acoustic horn is equal to the cross section of the second opening of the second acoustic horn, and a ratio between the cross section of the enclosure at the second axial end and the cross section of the second opening of the first acoustic horn is comprised between 2 and 100.

17. The acoustic absorption cell according to claim 15, wherein a distance between the first opening and the second opening of the first acoustic horn in the axial direction is equal to the distance between the first opening and the second opening of the second acoustic horn in the axial direction, and a ratio between the distance between the first opening and the second opening of the first acoustic horn in the axial direction and a height of the enclosure measured in the axial direction between its first end and its second end is comprised between 0.2 and 0.6.

18. The acoustic absorption cell according to claim 15, wherein at the first axial end the first acoustic horn forms a first opening angle with a plane parallel with the acoustically porous inlet wall of the acoustic absorption cell and, at its first opening the second acoustic horn forms a second opening angle with a plane parallel with the acoustically porous inlet wall of the acoustic absorption cell.

19. The acoustic absorption cell according to claim 18, wherein the second opening angle is identical to the first opening angle.

20. An acoustic absorption cell comprising an acoustically opaque bottom wall, an acoustically porous inlet wall, an enclosure extending in an axial direction between a first axial end integral with the acoustically opaque bottom wall and a second axial end integral with the acoustically porous inlet wall, and a first acoustic horn extending inside the enclosure between a first opening of the first acoustic horn and a second opening of the first acoustic horn that is smaller than said first opening of the first acoustic horn, the first opening facing said acoustically porous inlet wall,
wherein the acoustic absorption cell comprises at least one second acoustic horn extending inside the enclosure between a first opening of the second acoustic horn and a second opening of the second acoustic horn that is smaller than said first opening of the second acoustic horn, the second opening of the second acoustic horn being arranged facing said acoustically opaque bottom wall, and either the first opening of the second acoustic horn is arranged facing the second opening of the first acoustic horn, or the first acoustic horn and the second acoustic horn are coaxial and the first acoustic horn is inserted at least partially in the second acoustic horn,
wherein the first acoustic horn and the second acoustic horn have identical shapes and dimensions, the first acoustic horn and the second acoustic horn each comprising a cylindrical portion with a cross section equal to a cross section of each second opening, a ratio between a length of the cylindrical portion in the axial direction and a length of the acoustic horn in the axial direction being less than or equal to 0.8.

\* \* \* \* \*